United States Patent
Jacobson et al.

(10) Patent No.: US 12,380,207 B2
(45) Date of Patent: Aug. 5, 2025

(54) VIRTUAL MACHINE IMAGE MANAGEMENT SYSTEM

(71) Applicant: Bank of America Corporation, Charlotte, NC (US)

(72) Inventors: Brian Jacobson, Los Angeles, CA (US); Boris Gitlin, East Bruswick, NJ (US); Donna Phillips, Elkton, MD (US); Elvis Nyamwange, Little Elm, TX (US); Madhukiran Bangalore Ramachandra, San Ramon, CA (US); Vismay Mandloi, Kendal Park, NJ (US)

(73) Assignee: Bank of America Corporation, Charlotte, NC (US)

( * ) Notice: Subject to any disclaimer, the term of this patent is extended or adjusted under 35 U.S.C. 154(b) by 213 days.

(21) Appl. No.: 17/978,637

(22) Filed: Nov. 1, 2022

(65) Prior Publication Data
US 2024/0143748 A1    May 2, 2024

(51) Int. Cl.
G06F 21/55    (2013.01)
G06F 21/56    (2013.01)

(52) U.S. Cl.
CPC .......... *G06F 21/554* (2013.01); *G06F 21/568* (2013.01)

(58) Field of Classification Search
CPC .............................................. G06F 21/50–577
See application file for complete search history.

(56) References Cited

U.S. PATENT DOCUMENTS

| | | | |
|---|---|---|---|
| 7,797,748 B2 | 9/2010 | Zheng et al. | |
| 8,572,741 B2 | 10/2013 | Sapuntzakis et al. | |
| 8,813,233 B1* | 8/2014 | Wilson | G06F 21/577 718/1 |
| 9,389,899 B2 | 7/2016 | Tsirkin et al. | |
| 10,102,023 B2 | 10/2018 | Tsirkin et al. | |
| 10,108,444 B2 | 10/2018 | De Santis et al. | |
| 10,379,894 B1* | 8/2019 | Cruz Oliveira Queiros | H04L 63/08 |
| 10,402,560 B2 | 9/2019 | Gilbert | |
| 11,151,248 B1* | 10/2021 | Batur | G06F 21/565 |
| 2008/0263658 A1* | 10/2008 | Michael | G06F 21/562 726/22 |
| 2010/0017512 A1* | 1/2010 | Ciano | G06F 21/57 718/1 |

(Continued)

*Primary Examiner* — Trong H Nguyen
(74) *Attorney, Agent, or Firm* — Banner & Witcoff, Ltd.

(57) ABSTRACT

Virtual machine images may be constantly scanned using background process, to identify current and evolving security risks, such as by optimizing the image scanning a last-in, first-out (LIFO) stack to prioritize most relevant images. Older and/or non-relevant image are removed from the scanning process and removed from use. Virtual machines image prioritization is based on each virtual machine image's current and/or potential usage requirement, where the LIFO stack prioritizes the scanning order. Newly created virtual machine images and/or newly re-activated virtual machine images are placed onto a provisioning queue (first-in, first out) before activation. The virtual machine images active within a host computing environment are processed via a reconciliation process to scan for indications of security vulnerabilities and/or threats to network security. Obsolete or otherwise irrelevant virtual machine images are removed from use via a repository synchronization process.

17 Claims, 4 Drawing Sheets

(56) References Cited

U.S. PATENT DOCUMENTS

| | | |
|---|---|---|
| 2012/0096550 A1 | 4/2012 | Sapuntzakis et al. |
| 2014/0053272 A1 | 2/2014 | Lukacs et al. |
| 2015/0033223 A1* | 1/2015 | Chari .................. G06F 9/45558 718/1 |
| 2015/0370593 A1* | 12/2015 | Kuroda ............... G06F 9/44505 718/1 |
| 2019/0392144 A1* | 12/2019 | Chen ..................... G06F 21/561 |
| 2020/0210571 A1 | 7/2020 | Vlaznev et al. |
| 2021/0173935 A1* | 6/2021 | Ramasamy ........... G06F 21/577 |
| 2022/0019452 A1* | 1/2022 | Levin ................... G06F 9/5077 |
| 2023/0056770 A1* | 2/2023 | Meier .................... G06F 21/54 |
| 2024/0070276 A1* | 2/2024 | Gray .................... G06F 21/577 |

\* cited by examiner

VIRTUAL MACHINE IMAGE MANAGEMENT SYSTEM

BACKGROUND

Large organizations, such as financial institutions and other large enterprise organizations, may provide many different products and/or services. To support these complex and large-scale operations, a large organization may own, operate, and/or maintain many different computer systems that service different internal users and/or external users in connection with different products and services. In addition, some computer systems internal to the organization may be configured to exchange information with computer systems external to the organization to provide and/or support different products and services offered by the organization. In some cases, the enterprise organization may utilize virtual machines, which are software-based implementation of a computing device that executes programs like a physical machine. Multiple virtual machines may run on a single computer hardware platform, which is also referred to as "host machine" or a "host computing environment." Although the virtual machines run in the same host computing environment, each virtual machine has its own operating system and application programs, and functions as a computing environment separate from the host computing environment and the other virtual machines.

Often, host computing environments may include a could computing environment that may include a centrally located computing platform, such as an internet based service providing storage, processing, and other computing tasks performed via a networked connection using pooled server computers. Cloud computing provides computational resources to an end-user without the end-user setting up and running a computing infrastructure. Public cloud service providers may provide public and private cloud computing environments to multiple customers.

As a result of the complexity associated with the operations of a large organization and its computer systems, it may be difficult for such an organization, such as a financial institution, to efficiently, effectively, securely, and uniformly manage its computer systems, and particularly manage security of multiple virtual machine images running on internal and external computing platforms, such as a cloud computing environment. Each virtual machine image may include an operating system and other software for providing services to internal and/or external users of the enterprise computing network. A problem enterprise network security due to virtual machine images may be exposed to external threats and/or attempts to infiltrate the enterprise network. As such, a need has been recognized to ensure that existing, saved and newly created virtual machine virtual machine images remain free of malware, such as computer viruses, Trojans, spyware, and other malicious codes.

SUMMARY

The following presents a simplified summary in order to provide a basic understanding of some aspects of the disclosure. The summary is not an extensive overview of the disclosure. It is neither intended to identify key or critical elements of the disclosure nor to delineate the scope of the disclosure. The following summary presents some concepts of the disclosure in a simplified form as a prelude to the description below.

Aspects of the disclosure relate to computer systems that provide effective, efficient, scalable, and convenient ways of securely and uniformly managing how internal computer systems exchange information with external computer systems to provide and/or support different products and services offered by an organization (e.g., a financial institution, and the like).

Aspects of the disclosure relate to computer hardware and software. In particular, one or more aspects of the disclosure generally relate to computer hardware and software for optimizing virtual machine scanning and management to prioritize the most relevant virtual machine image while removing compromised and/or obsolete images from use.

A system of one or more computers can be configured to perform particular operations or actions by virtue of having software, firmware, hardware, or a combination of them installed on the system that in operation causes or cause the system to perform the actions. One or more computer programs can be configured to perform particular operations or actions by virtue of including instructions that, when executed by data processing apparatus, cause the apparatus to perform the actions. One general aspect includes constantly scanning virtual machine images in a prioritized manner to identify the most relevant images and remove compromised and/or obsolete image from the associated computing platform.

In some cases, the virtual machine images may be constantly scanned using background process, such as to identify current and evolving security risks. The image scanning may be optimized by using a last in-first out (LIFO) stack to prioritize most relevant images. Older and/or non-relevant image may be removed from the scanning process and removed from consideration for use. The method to prioritize virtual machines images for consideration by users is based on each virtual machine image's current and/or potential usage requirements. Additionally, the LIFO stack prioritizes the scanning order. In some cases, newly created virtual machine images and/or newly re-activated virtual machine images may be placed onto a provisioning queue before activation. The virtual machine images presently active within the host computing environment may be identified via a reconciliation process, to ensure that they remain free of security threats. Any obsolete or otherwise irrelevant virtual machine images may be taken out of use via a repository synchronization process.

These features, along with many others, are discussed in greater detail below.

BRIEF DESCRIPTION OF THE DRAWINGS

The present disclosure is illustrated by way of example and not limited in the accompanying figures in which like reference numerals indicate similar elements and in which.

DETAILED DESCRIPTION

Figure 1A:
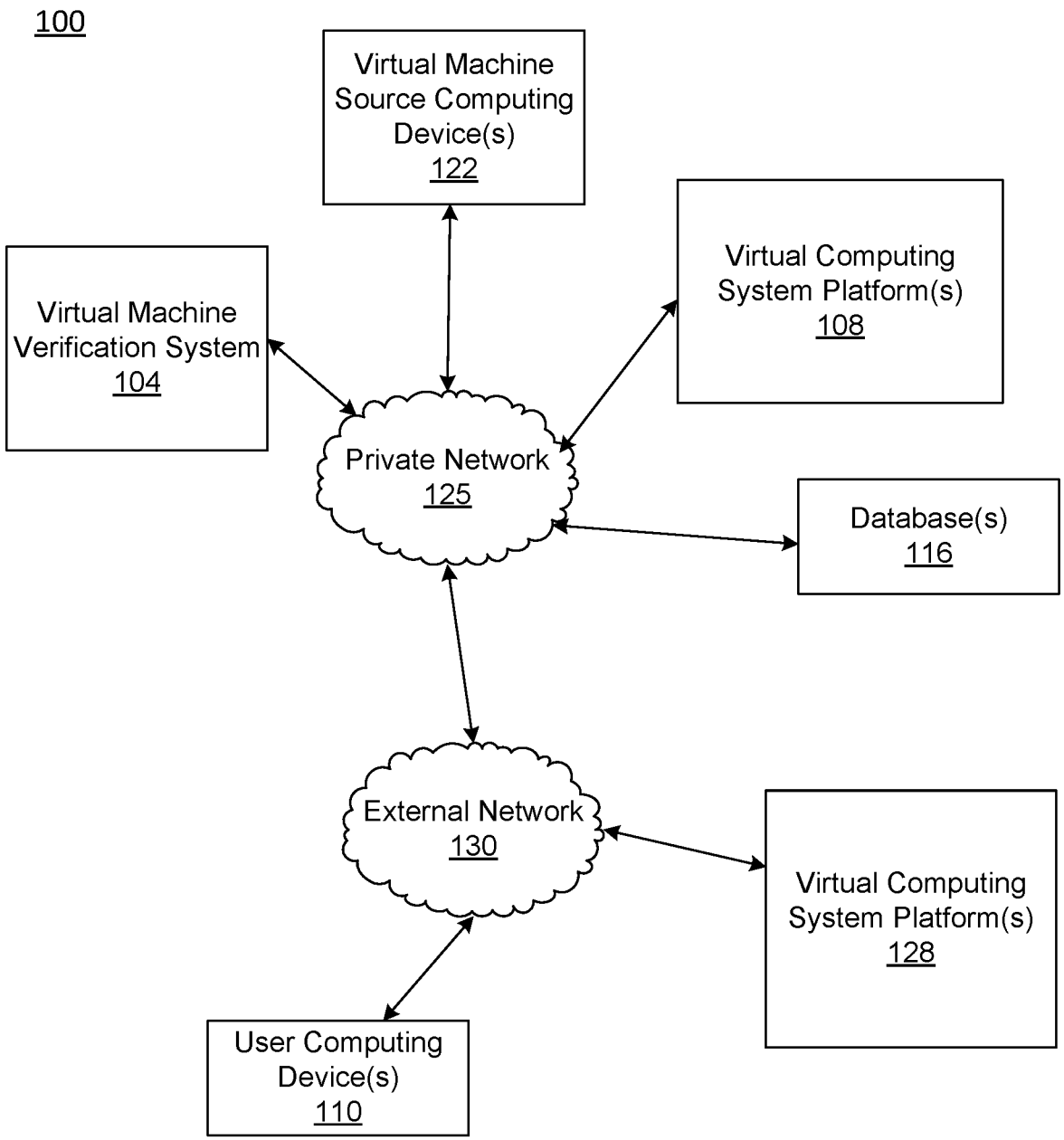
FIG. 1A shows an illustrative computing environment for managing use and security of virtual machine images for use within a host computing environment, in accordance with one or more aspects described herein.

In the following description of various illustrative embodiments, reference is made to the accompanying drawings, which form a part hereof, and in which is shown, by way of illustration, various embodiments in which aspects of the disclosure may be practiced. It is to be understood that other embodiments may be utilized, and structural and functional modifications may be made, without departing from the scope of the present disclosure.

It is noted that various connections between elements are discussed in the following description. It is noted that these connections are general and, unless specified otherwise, may be direct or indirect, wired or wireless, and that the specification is not intended to be limiting in this respect.

As used throughout this disclosure, computer-executable "software and data" can include one or more: algorithms, applications, application program interfaces (APIs), attachments, big data, daemons, emails, encryptions, databases, datasets, drivers, data structures, file systems or distributed file systems, firmware, graphical user interfaces, images, instructions, machine learning (e.g., supervised, semi-supervised, reinforcement, and unsupervised), middleware, modules, objects, operating systems, processes, protocols, programs, scripts, tools, and utilities. The computer-executable software and data is on tangible, computer-readable memory (local, in network-attached storage, or remote), can be stored in volatile or non-volatile memory, and can operate autonomously, on-demand, on a schedule, and/or spontaneously.

"Computer machines" can include one or more: general-purpose or special-purpose network-accessible administrative computers, clusters, computing devices, computing platforms, desktop computers, distributed systems, enterprise computers, laptop or notebook computers, primary node computers, nodes, personal computers, portable electronic devices, servers, node computers, smart devices, tablets, and/or workstations, which have one or more microprocessors or executors for executing or accessing the computer-executable software and data. References to computer machines and names of devices within this definition are used interchangeably in this specification and are not considered limiting or exclusive to only a specific type of device. Instead, references in this disclosure to computer machines and the like are to be interpreted broadly as understood by skilled artisans. Further, as used in this specification, computer machines also include all hardware and components typically contained therein such as, for example, processors, executors, cores, volatile and non-volatile memories, communication interfaces, etc.

Computer "networks" can include one or more local area networks (LANs), wide area networks (WANs), the Internet, wireless networks, digital subscriber line (DSL) networks, frame relay networks, asynchronous transfer mode (ATM) networks, virtual private networks (VPN), or any combination of the same. Networks also include associated "network equipment" such as access points, ethernet adaptors (physical and wireless), firewalls, hubs, modems, routers, and/or switches located inside the network and/or on its periphery, and software executing on the foregoing.

The above-described examples and arrangements are merely some examples of arrangements in which the systems described herein may be used. Various other arrangements employing aspects described herein may be used without departing from the innovative concepts described.

A virtual machine image management system may continually scan and/or manage a large volume of virtual machine images using background process, to identify current and evolving security risks, such as by optimizing the image scanning a last-in, first-out (LIFO) stack to prioritize most relevant images. Additionally, the virtual machine image management system may remove older, antiquated, and/or otherwise non-relevant images from the scanning process and remove such virtual machine images from use. The virtual machine image management system may use a virtual machine image prioritization based on each virtual machine image's current and/or potential usage requirements, such as by using a LIFO stack to prioritize the scanning order. Newly created virtual machine images and/or newly re-activated virtual machine images may be placed onto a provisioning queue (first-in, first out) before activation. The virtual machine images presently active within a host computing environment (e.g., a cloud computing environment, and the like) may be processed via a reconciliation process to scan for indications of security vulnerabilities and/or threats to network security. The reconciliation process may operate periodically, on demand, or in response to a triggering event (e.g., an update to an installed operations system or application, an indication that a similar virtual machine image has experienced a security threat, and/or the like). Compromised, obsolete or otherwise irrelevant virtual machine images are removed from use via a repository synchronization process automatically operated by the virtual machine image management system.

Often, enterprise organizations use virtual computing environment services (e.g., cloud computing services) to expand computing capabilities of their enterprise networks. To use these virtual computing services, the enterprise must spin up virtual machines and download code on the images to run up in the cloud. Because each virtual machine image is spun up in a virtual machine environment associated with a service provider, and is then able to access networks internal and/or external to the enterprise network, the virtual machine images must be monitored and/or scanned on a periodic and/or on-demand basis to ensure the virtual machine images are safe to be spun up, e.g., free of viruses and/or malware, and have versions of software, drivers and/or other services without known security vulnerabilities.

FIG. 1A shows an illustrative computing environment 100 for managing use and security of virtual machine images for use within a host computing environment, in accordance with one or more arrangements. The computing environment 100 may comprise one or more devices (e.g., computer systems, communication devices, and the like). The computing environment 100 may comprise, for example, a virtual machine verification system 104, one or more virtual machine source computing device(s) 108, one or more virtual computing system platform(s) and/or one or more database(s) 116. The one or more of the devices and/or systems, may be linked over a private network 125 associated with an enterprise organization (e.g., a financial institution, a business organization, an educational institution, a governmental organization and the like). The computing environment 100 may additionally comprise a client computing system 120 and one or more user devices 110 connected, via a public network 130, to the devices in the private network 125. The devices in the computing environment 100 may transmit/exchange/share information via hardware and/or software interfaces using one or more communication protocols. The communication protocols may be any wired communication protocol(s), wireless communication protocol(s), one or more protocols corresponding to one or more layers in the Open Systems Interconnection (OSI) model (e.g., local area network (LAN) protocol, an Institution of Electrical and Electronics Engineers (IEEE) 802.11 WIFI protocol, a $3^{rd}$ Generation Partnership Project (3GPP) cellular protocol, a hypertext transfer protocol (HTTP), etc.). While FIG. 1A shows the virtual computing system platforms 108 and an external virtual computing system platform 128, the system 100 may include one or both of the virtual computing system platforms 108 and the external virtual computing system platform 128.

The virtual machine verification system 104 may comprise one or more computing devices and/or other computer components (e.g., processors, memories, communication interfaces) configured to perform one or more functions as described herein. Further details associated with the architecture of the virtual machine verification system 104 are described with reference to FIG. 1B.

The system 100 may further include one or more application systems, which may be processed via one or more virtual machines on the virtual computing systems platforms 108 and/or the external virtual computing system platform 128. The application system and/or a virtual client system may comprise one or more virtual machine running on computing devices and/or other computer components (e.g., processors, memories, communication interfaces) within a virtual computing environment (e.g., the virtual computing system platforms 108 and/or the virtual computing system platform 128. In addition, the application system and/or the client system may be configured to host, execute, and/or otherwise provide one or more enterprise applications. In some cases, the application systems may host one or more services configured facilitate operations requested through one or more API calls, such as data retrieval and/or initiating processing of specified functionality. In some cases, the client computing system may be configured to communicate with one or more of the application systems such as via direct communications and/or API function calls and the services. In an arrangement where the private network 125 is associated with a financial institution (e.g., a bank), the application systems may be configured, for example, to host, execute, and/or otherwise provide one or more transaction processing programs, such as an online banking application, fund transfer applications, and/or other programs associated with the financial institution. The client computing system and/or the application systems may comprise various servers and/or databases that store and/or otherwise maintain account information, such as financial account information including account balances, transaction history, account owner information, and/or other information. In addition, the client computing system and/or the application systems may process and/or otherwise execute transactions on specific accounts based on commands and/or other information received from other computer systems comprising the computing environment 100. In some cases, one or more of the client computing system and/or the application systems may be configured, for example, to host, execute, and/or otherwise provide one or more transaction processing programs, such as electronic fund transfer applications, online loan processing applications, and/or other programs associated with the financial institution.

The application systems may be one or more virtual host devices (e.g., a virtual machine image) or other computing devices (e.g., a workstation, a host, a server, a smartphone, a tablet and/or the like). In addition, an application systems may be linked to and/or operated by a specific enterprise user (who may, for example, be an employee or other affiliate of the enterprise organization) who may have administrative privileges to perform various operations within the private network 125. In some cases, the application system may be capable of performing one or more layers of user identification based on one or more different user verification technologies including, but not limited to, password protection, pass phrase identification, biometric identification, voice recognition, facial recognition and/or the like. In some cases, a first level of user identification may be used, for example, for logging into an application or a web server and a second level of user identification may be used to enable certain activities and/or activate certain access rights.

The client computing system may comprise a virtual machine image and/or one or more computing devices and/or other computer components (e.g., processors, memories, communication interfaces). The client computing system may be configured, for example, to host, execute, and/or otherwise provide one or more transaction processing programs, such as goods ordering applications, electronic fund transfer applications, online loan processing applications, and/or other programs associated with providing a product or service to a user. With reference to the example where the client computing system is for processing an electronic exchange of goods and/or services. The client computing system may be associated with a specific goods purchasing activity, such as purchasing a vehicle, transferring title of real estate may perform communicate with one or more other platforms within the client computing system. In some cases, the client computing system may integrate API calls to request data, initiate functionality, or otherwise communicate with the one or more application systems, such as via the services. For example, the services may be configured to facilitate data communications (e.g., data gathering functions, data writing functions, and the like) between the client computing system and the one or more application systems.

The user computing device(s) 110 may be computing devices (e.g., desktop computers, laptop computers) or mobile computing device (e.g., smartphones, tablets) connected to the network 125. The user device(s) 110 may be configured to enable the user to access the various functionalities provided by the devices, applications, and/or systems in the network 125. In some cases, one or more user computing device 110 may be virtual machine images processed in a virtual computing environment (e.g., the virtual computing system platform and/or the virtual computing system platform 128).

The database(s) 116 may comprise one or more computer-readable memories storing information that may be used by virtual machine verification system 104. For example, the database(s) 116 may store one or more approved virtual machine images, one or more archived virtual machine images, virtual machine image information, and/or the like. In an arrangement, the database(s) 116 may be used for other purposes as described herein. In some cases, the client computing system 120 may write data or read data to the database(s) 116 via the services.

In one or more arrangements, the virtual machine verification system 104, the virtual computing system platforms 108 and 128, the virtual machine source computing device 122, the user devices 110, and/or the other devices/systems in the computing environment 100 may be any type of computing device capable of receiving input via a user interface, and communicating the received input to one or more other computing devices in the computing environment 100. For example, the virtual machine verification system 104, the virtual computing system platforms 108 and 128, the virtual machine source computing device 122, the user devices 110, and/or the other devices/systems in the computing environment 100 may, in some instances, be and/or include server computers, desktop computers, laptop computers, tablet computers, smart phones, wearable devices, or the like that may comprised of one or more processors, memories, communication interfaces, storage devices, and/or other components. Any and/or all of the virtual machine verification system 104, the virtual computing system platforms 108 and 128, the virtual machine source computing device 122, the user devices 110, and/or the other devices/systems in the computing environment 100 may, in some instances, be and/or comprise special-purpose computing devices configured to perform specific functions.

Figure 1B:
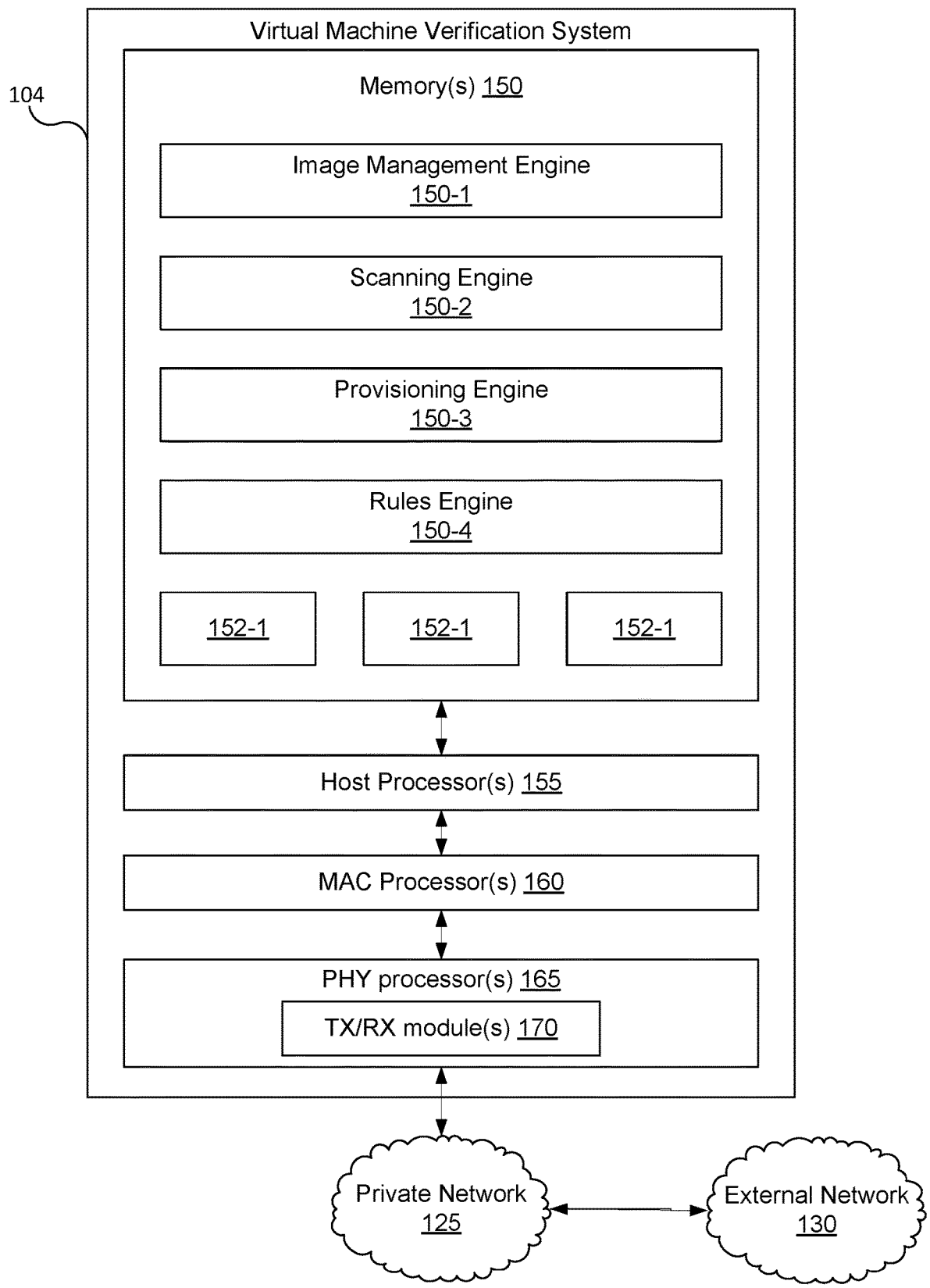
FIG. 1B shows an illustrative computing platform enabled for managing use and security of virtual machine images for use within a host computing environment, in accordance with one or more aspects described herein.

FIG. 1B shows an illustrative virtual machine verification system 104 in accordance with one or more examples described herein. The virtual machine verification system 104 may be a stand-alone device and/or may at least be partial integrated with another computing system and may comprise one or more of host processor(s) 155, medium access control (MAC) processor(s) 160, physical layer (PHY) processor(s) 165, transmit/receive (TX/RX) module(s) 170, memory 150, and/or the like. One or more data buses may interconnect host processor(s) 155, MAC processor(s) 160, PHY processor(s) 165, and/or Tx/Rx module(s) 170, and/or memory 150. The virtual machine verification system 104 may be implemented using one or more integrated circuits (ICs), software, or a combination thereof, configured to operate as discussed below. The host processor(s) 155, the MAC processor(s) 160, and the PHY processor(s) 165 may be implemented, at least partially, on a single IC or multiple ICs. The memory 150 may be any memory such as a random-access memory (RAM), a read-only memory (ROM), a flash memory, or any other electronically readable memory, or the like.

Messages transmitted from and received at devices in the computing environment 100 may be encoded in one or more MAC data units and/or PHY data units. The MAC processor(s) 160 and/or the PHY processor(s) 165 of the virtual machine verification system 104 may be configured to generate data units, and process received data units, that conform to any suitable wired and/or wireless communication protocol. For example, the MAC processor(s) 160 may be configured to implement MAC layer functions, and the PHY processor(s) 165 may be configured to implement PHY layer functions corresponding to the communication protocol. The MAC processor(s) 160 may, for example, generate MAC data units (e.g., MAC protocol data units (MPDUs)), and forward the MAC data units to the PHY processor(s) 165. The PHY processor(s) 165 may, for example, generate PHY data units (e.g., PHY protocol data units (PPDUs)) based on the MAC data units. The generated PHY data units may be transmitted via the TX/RX module(s) 170 over the private network 155. Similarly, the PHY processor(s) 165 may receive PHY data units from the TX/RX module(s) 165, extract MAC data units encapsulated within the PHY data units, and forward the extracted MAC data units to the MAC processor(s). The MAC processor(s) 160 may then process the MAC data units as forwarded by the PHY processor(s) 165.

One or more processors (e.g., the host processor(s) 155, the MAC processor(s) 160, the PHY processor(s) 165, and/or the like) of the virtual machine verification system 104 may be configured to execute machine readable instructions stored in memory 150. The memory 150 may comprise (i) one or more program modules/engines having instructions that when executed by the one or more processors cause the virtual machine verification system 104 to perform one or more functions described herein and/or (ii) one or more databases that may store and/or otherwise maintain information which may be used by the one or more program modules/engines and/or the one or more processors. The one or more program modules/engines and/or databases may be stored by and/or maintained in different memory units of the virtual machine verification system 104 and/or by different computing devices that may form and/or otherwise make up the virtual machine verification system 104. For example, the memory 150 may have, store, and/or comprise an image management engine 150-1, a scanning engine 150-2, a provisioning engine 150-3, a rules engine 150-4 and/or the like. The image management engine 150-1 may have instructions that direct and/or cause the virtual machine verification system 104 to perform one or more operations associated with a running image synchronization process, performing an image activation process, and/or performing an image repository synchronization process. The scanning engine 150-2 may have instructions that may cause the virtual machine verification system 104 to scan one or more virtual machine images for vulnerabilities, viruses, malware and/or the like. The provisioning engine 150-3 may have instructions that may cause the virtual machine verification system 104 to initiate scanning and/or restoration of a stored and/or re-activated virtual machine image. The rules engine 150-4 may have instructions that may cause the virtual machine verification system 104 to process each virtual machine image according to a set of business rules and/or technological rules to ensure each virtual machine image meets a predefined safety and/or system vulnerability target.

While FIG. 1A illustrates the virtual machine verification system 104, virtual machine source computing devices 122, and/or the virtual computing system platforms 108, as being separate elements connected in the private network 125, in one or more other arrangements, functions of one or more of the above may be integrated in a single device/network of devices. For example, elements in the virtual machine verification system (e.g., host processor(s) 155, memory(s) 150, MAC processor(s) 160, PHY processor(s) 165, TX/RX module(s) 170, and/or one or more program/modules stored in memory(s) 150) may share hardware and software elements with and corresponding to, for example, the virtual machine source computing devices 122, and/or the virtual computing system platforms 108.

Figure 2:
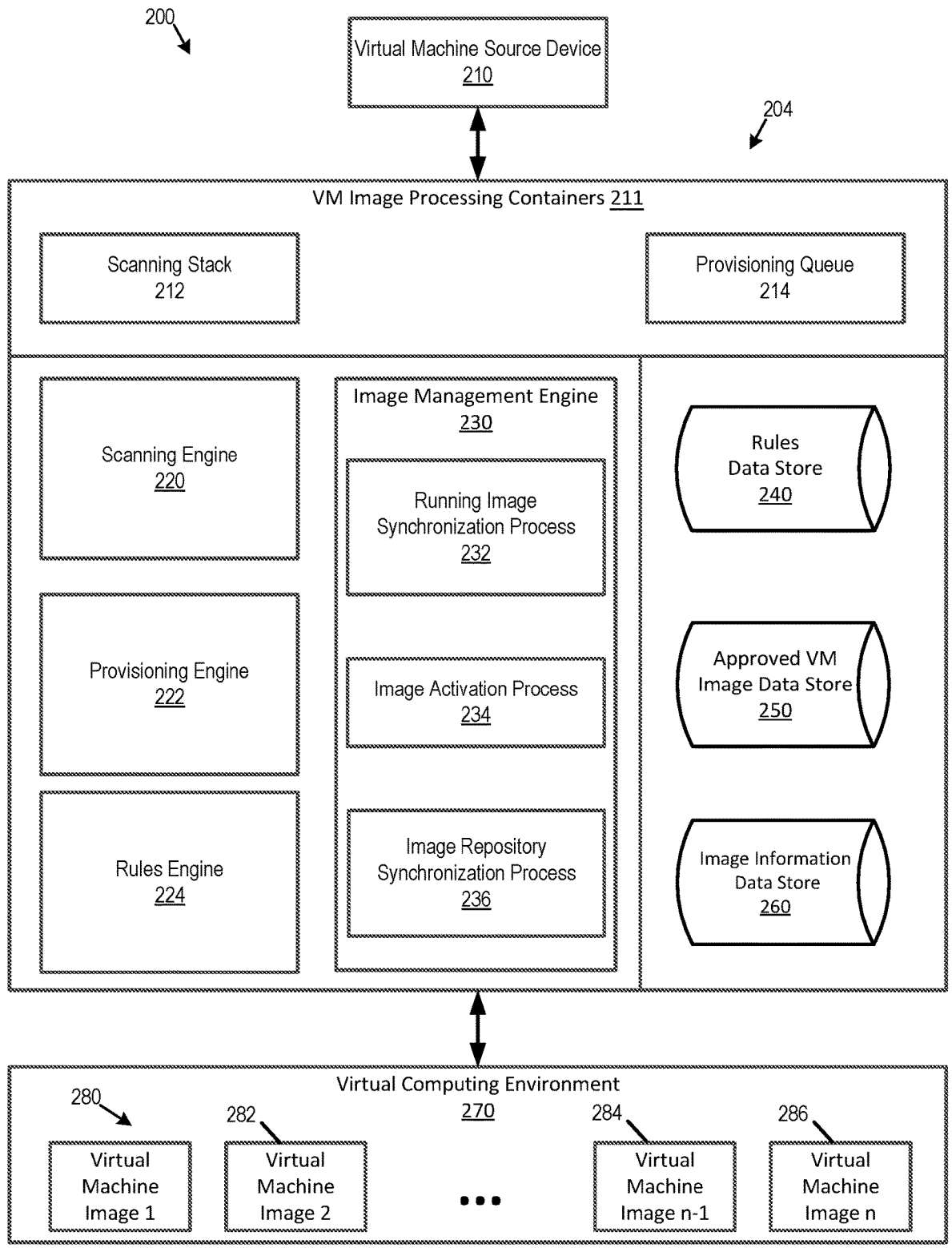
FIG. 2 shows an illustrative block diagram of a computing environment to manage virtual machine image activation and scanning processes, in accordance with one or more example arrangements.

FIG. 2 shows an illustrative block diagram of a computing environment 200 to manage virtual machine image activation and scanning processes, in accordance with one or more example arrangements. For example, the computing environment 200 may include a virtual machine source device 210 communicatively coupled to a computing system comprising a plurality of virtual image processing containers (e.g., a scanning stack 212 and a provisioning queue 214), a plurality of virtual image processing engines, such as a scanning engine 220, a provisioning engine 222, a rules engine 224, and an image management engine 230, and/or a plurality of data repositories, such as a rules data store 240, an approved virtual image data store 250, and an image information data store 260. The image management engine may process instructions to provide a running image synchronization process 232, an image activation process 235, and an image repository synchronization process 236. The computing environment may include and/or may be communicatively coupled to a virtual computing environment 270, which may be a computing platform to facilitate operation of multiple virtual machines 280 (e.g., virtual computing devices).

The virtual machine source device 210 may be a computing device capable of generating a virtual machine image configured for operation on one or more virtual machine platforms, such as the virtual computing environment 270. In some cases, the virtual machine source device 210 may further include a data repository storing one or more virtual machine images for use in the virtual computing environment 270. The virtual computing environment 270 may be used to expand or add computing resources to the enterprise computing network. By allocating computing processes and resources to a virtual environment, virtual machines may be available to provide processes and/or applications to increase overall efficiency of the enterprise computing network. The virtual computing environment 270 may be provided as a cloud computing network, a virtualized computing environment utilizing computing hardware (e.g., servers) connected locally to the enterprise network, a virtualized computing environment on a local computing device (e.g., a workstation) and/or the like.

Because the virtual machines may be available for remote and/or on-demand usage by users and may be configurable based on user preferences and/or requirements of applications and/or services run by the virtual machines. As such, the virtual machines can be accessed remotely and may be subject to system vulnerabilities and/or malicious applications (e.g., viruses, malware, and the like). As such, a virtual machine verification system 204 may monitor and/or manage virtual machine images to ensure stability and security of the virtualized computing environment of the enterprise computing network. The virtual machine images may be scanned on creation, on activation from an archive, on archive, and/or on a periodic or on-demand basis while the virtual machine is running within the virtual computing environment 270.

The virtual machine source device 210 may be configured to generate one or more virtual machine images, such as an image that is a fully configured virtual machine used for deployment to the enterprise network. For example, the VM image may be optimized so to meet the needs of an application and/or service to be provided via the running virtual machine, while not running any extra services. In some cases, an enterprise may provision all the resources associated with a service, such as operating systems, databases, application servers, and the like, in the form of a virtual machine image. This virtual machine image may be deployed, such as to the virtual machine computing environment 270 with a configuration file, or other mechanism setting desired configuration parameters, such as a number of virtual central processing units (CPUs), an amount of memory, software version(s), operating system(s), and/or custom or vendor specific software, as required by an application. In some cases, a provider of the virtual computing environment 270 (e.g., a cloud computing provider) may build a library of images containing standard software configurations that can be deployed in minutes by customers via a self-service portal.

In some case, the virtual machine verification system 204 includes a process to scan virtual machine images before the images are provisioned to the virtual computing environment (e.g., the cloud service provider). Often, this process can be lengthy because each virtual machine image provisioned to the virtual computing environment 270 is subjected to a full virus and/or malware scan. As such, the virus/malware scan may cause significant delays in the process, and virtual machine images may not be provisioned in a timely manner. Additionally, scanning such a large number of virtual machine images requires enormous computing power capability, further increasing costs. The virtual machine verification system 204 optimizes the scanning and provisioning process, such that only approved images are stored in an approved virtual image data store 250, and only approved images are uploaded by the provisioning engine 222 and/or the image activation process 234.

The virtual machine verification system 204 may include the VM image processing containers 211 to manage and prioritization of virtual machine image processing, scanning and/or synchronization. For example, the scanning stack 212 may be a last-in, first out stack that allows higher priority, such as more frequently used, virtual machine images to be scanned more frequently, as these images will be loaded onto the scanning stack 212 more frequently than other less used virtual machine images. The approved VM image data store 250 stores multiple virtual machine images, where some virtual machine images are used frequently, some virtual machine images used less frequently, and some that are used infrequently or are obsolete. If all images are constantly scanned for vulnerabilities, or scanned on a recurring periodic basis, the scanning process becomes a bottleneck. However, scanning cannot only be performed once, because the rules applied to the virtual machines, stored in the rules data store 240, may be continually updated. The scanning engine runs a scanning process as an ongoing process to ensure the virtual machine images remain safe to be provisioned. This scanning process is optimized so that virtual machine images currently in use, currently requested to be provisioned, and/or recently modified may be scanned in a timely manner and where the most recent rules set stored in the rules data store may be applied. The scanning stack, as a first-in, last-out queue, allows for the most recently added virtual machine images to be scanned before more infrequently or unused virtual machine images. Because the scanning engine pulls the first virtual machine image off the top of the stack, the most recently added virtual machine image is ensured to be scanned first.

When the scanning engine 220 approves the scanned virtual machine image, the approved virtual machine image is stored in the approved virtual machine image data store 250. When the virtual machine image is requested to be provisioned to the virtual computing environment 270, the requested virtual machine image is pulled from the approved VM image data store 250 to be scanned, if the last scan was not performed recently (e.g., within a specified time period.) the requested virtual machine image is then loaded onto the top of the scanning stack 212 before being loaded into the provisioning queue 214. In doing so, the most recently requested virtual machine images may be scanned first, while the less frequently used virtual machine images may be scanned less frequently or not at all. The lesser used or unused images in the stack may be managed by the image repository synchronization process 236 to remove the unused virtual machine images or lesser used virtual machine images from the scanning stack. In some cases, the image repository synchronization process 236 may also remove the lesser scanned virtual machine images from the approved VM image data store 250, such as when a virtual machine image has been unused and/or unscanned for a certain period of time (e.g., 1 week, 1 month, 1 year or the like).

The rules data store 240 stores rules that are applied against the virtual machine images to ensure that the virtual machine images are safe and/or acceptable to be provisioned to the virtual computing environment 270 and the enterprise network. The rules engine 224 actively applies the rules to each virtual machine image such as by the provisioning engine 222 and the image repository synchronization process 236. In general, the rules may define levels of severity of security policy violations, where each severity level may require a different action to be performed. For example, a severity level 1 problem may require that a virtual machine image be immediately removed and/or quarantined from the system, while a less severe policy violation (e.g., a severity level 2, severity level 3) may allow time for the problem to be addressed, such as within 1 week for a level 2 violation, and within 1 month for a level 3 violation. For example, a severity level 1 problem may be a severe system vulnerability that may expose the virtual machine image to potential use by malicious actors or other catastrophic network errors.

Because the rules are associated with not only security policies of the enterprise organization, but also identify vulnerabilities that may be recently recognized, the rules must be applied to the virtual machine images 280 running within the virtual machine environment on a regular basis. As such, the running image synchronization process 232 may monitor the virtual machines (e.g., VM 282, VM 284, VM 286, and the like) running within the virtual computing environment 270 and push the running virtual machine images to the top of the scanning stack 212. As such, each newly created virtual machine image, any virtual machine image requested to be provisioned (e.g., restoration of a previously used virtual machine images stored in the approved virtual machine data store 250, and images of running virtual machines 280 may be checked on a periodic basis (e.g., hourly, constantly, and the like). The scanning stack 212 ensures that most relevant images are always pushed to the top of the stack to optimize the process, so that the most relevant virtual machine images are being scanned and are usable on the enterprise network. In short, the rules determine usability of particular virtual machine images.

In some cases, the rules data store 240 may store rules that may be used to discarded unused images. For example, a rule may be defined to analyze access time for each virtual machine image stored in the approved VM image data store 250, such as where an image may be removed from the scanning stack if not scanned within a first period of time (e.g., 1 week) and may be removed from the approved VM image data store 250 if not scanned within a second time period (e.g., 1 month). In some cases, the removed virtual machine images may be archived or otherwise stored for later use. Based on the structure and operation of the system with the scanning stack, requested and/or operational virtual machine images may be prioritized within the scanning process.

The image repository synchronization process 236 may query the virtual computing environment 270 to identify which virtual machines 280 are running and may control the overall operation of the virtual machine operation in the virtual computing environment 270. For example, the image repository synchronization process 236 may identify virtual machine images that fail the scan and/or have been assigned a high severity level (e.g., severity level 1), the image repository synchronization process 236 may immediately stop the virtual machine (e.g., virtual machine 1) from running, remove the virtual machine from the virtual computing environment and remove or quarantine an associated virtual machine image from the approved virtual machine data store. In some cases, the image repository synchronization process 236 may send alerts or generate reports detailing operation of the system, such as by alerting to identified threats and/or vulnerabilities. In some cases, the image information data store 260 may store information corresponding to each virtual machine image, such as a creation data, a last scanning date, an assigned severity level (e.g., severity level 1, severity level 2, and the like), responsible individuals or computing systems to send alerts, information corresponding to the virtual machine configuration including software versioning information, driver versioning information, operating system versioning information, application versioning information, and the like.

Figure 3:
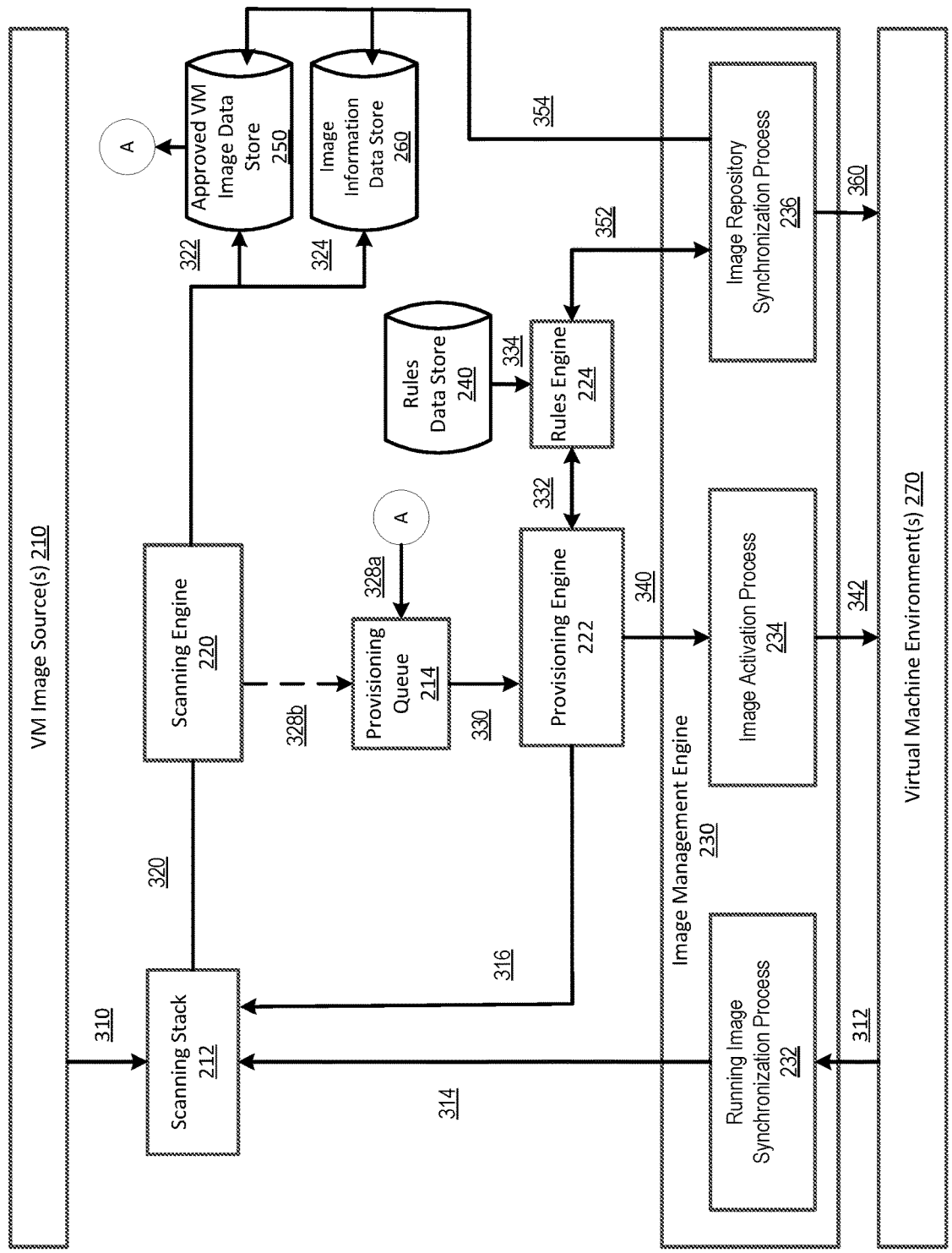
FIG. 3 shows an illustrative block diagram of a computing environment to manage virtual machine image activation and scanning processes in accordance with one or more aspects described herein.

FIG. 3 shows an illustrative block diagram of a computing environment to manage virtual machine image activation and scanning processes in accordance with one or more aspects described herein. At 310, a virtual machine image may be generated by or communicated from a virtual machine image source device 210 to the scanning stack 212 to be scanned. At 312, the running image synchronization process 232 may periodically image each virtual machine 280 operational within the virtual machine environment and assign, at 314, each image to be scanned by loading the virtual machine images onto the scanning stack 212. Additionally, at 316, the provisioning engine 222 may request that an image be scanned before being provisioned to the virtual computing environment 270, such as an image stored in the approved VM image data store 250.

At 320, the scanning engine 220 scans virtual machine image on the top of the scanning stack 212, where the most recently added (e.g., highest priority) virtual machine image is scanned. The scanning engine 220 stores an approved virtual machine image into the approved VM image data store 250 at 322 and stores information associated with each scanned virtual machine image into the image information data store 260 at 324. If the scanned virtual machine image fails the scan performed by the scanning engine 220, the image repository synchronization process may remove or quarantine a previously stored version of that particular virtual machine image from the approved VM image data store 250 for further processing.

When an image is requested to be provisioned, the requested virtual machine image may be loaded into the provisioning queue 214 from the approved VM image data store 250, at 328*a*. In some cases, an approved VM image may be loaded into the provisioning queue directly from the scanning engine 220 at 328*b*. The provisioning engine 222 loads each virtual machine image from the provisioning queue 214 at 330 and the rules engine 224 applies rules loaded from the rules data store 240 at 334. If the virtual machine image is cleared for loading onto the virtual machine environment 270, such as with an indication of no problems (e.g., operational status), or with lesser or correctible issues (e.g., severity level 2, severity level 3), the provisioning engine 222 may initiate an image activation process 234 at 340, where the image management engine 230 may either activate a newly provisioned virtual machine image or may allow a currently operational virtual machine 280 to remain operational within the virtual machine environment 270.

The image repository synchronization process 236 may monitor operation of the virtual machine computing environment, where the image repository synchronization process 236 may receive notification, at 352, from the rules engine 224 that a virtual machine image violated one or more rules and may perform certain actions based on a severity level. For example, at 354, the image repository synchronization process 354 may write severity level information t the image information data store 260, such as whether particular virtual machine images received a severity level (e.g., 1, 2, 3, and the like). For images assigned a severity level of 1, or upon expiration of a time period associated with a lower severity level without remediation, the image repository synchronization process 354 may quarantine or remove the virtual machine image from the approved VM image data store 250 and/or may stop and remove the failed virtual machine image from the virtual computing environment 270 at 360.

One or more aspects of the disclosure may be embodied in computer-usable data or computer-executable instructions, such as in one or more program modules, executed by one or more computers or other devices to perform the operations described herein. Generally, program modules include routines, programs, objects, components, data structures, and the like that perform particular tasks or implement particular abstract data types when executed by one or more processors in a computer or other data processing device. The computer-executable instructions may be stored as computer-readable instructions on a computer-readable medium such as a hard disk, optical disk, removable storage media, solid-state memory, RAM, and the like. The functionality of the program modules may be combined or distributed as desired in various embodiments. In addition, the functionality may be embodied in whole or in part in firmware or hardware equivalents, such as integrated circuits, application-specific integrated circuits (ASICs), field programmable gate arrays (FPGA), and the like. Particular data structures may be used to more effectively implement one or more aspects of the disclosure, and such data structures are contemplated to be within the scope of computer executable instructions and computer-usable data described herein.

Various aspects described herein may be embodied as a method, an apparatus, or as one or more computer-readable media storing computer-executable instructions. Accordingly, those aspects may take the form of an entirely hardware embodiment, an entirely software embodiment, an entirely firmware embodiment, or an embodiment combining software, hardware, and firmware aspects in any combination. In addition, various signals representing data or events as described herein may be transferred between a source and a destination in the form of light or electromagnetic waves traveling through signal-conducting media such as metal wires, optical fibers, or wireless transmission media (e.g., air or space). In general, the one or more computer-readable media may be and/or include one or more non-transitory computer-readable media.

As described herein, the various methods and acts may be operative across one or more computing servers and one or more networks. The functionality may be distributed in any manner, or may be located in a single computing device (e.g., a server, a client computer, and the like). For example, in alternative embodiments, one or more of the computing platforms discussed above may be combined into a single computing platform, and the various functions of each computing platform may be performed by the single computing platform. In such arrangements, any and/or all of the above-discussed communications between computing platforms may correspond to data being accessed, moved, modified, updated, and/or otherwise used by the single computing platform. Additionally, or alternatively, one or more of the computing platforms discussed above may be implemented in one or more virtual machines that are provided by one or more physical computing devices. In such arrangements, the various functions of each computing platform may be performed by the one or more virtual machines, and any and/or all of the above-discussed communications between computing platforms may correspond to data being accessed, moved, modified, updated, and/or otherwise used by the one or more virtual machines.

Aspects of the disclosure have been described in terms of illustrative embodiments thereof. Numerous other embodiments, modifications, and variations within the scope and spirit of the appended claims will occur to persons of ordinary skill in the art from a review of this disclosure. For example, one or more of the steps depicted in the illustrative figures may be performed in other than the recited order, and one or more depicted steps may be optional in accordance with aspects of the disclosure.

The invention claimed is:

1. A system comprising:
a virtual computing environment platform comprising at least one first processor configured to operate a virtual machine corresponding to an activated virtual machine (VM) image;
a VM image management platform, comprising:
at least one second processor; and
memory storing computer-readable instructions that, when executed by the at least one second processor, cause the VM image management platform to:
receive, continuously at a scanning stack, a plurality of virtual machine images, wherein the scanning stack comprises a last in first out (LIFO) stack;
add, continuously, virtual images to the scanning stack;
pull, by a scanning engine, a first VM image from the scanning stack;
scan, by the scanning engine, the first VM image, wherein the first VM image is stored in an approved image data store based on an indication that the scanning engine failed to identify a threat indicator;
provision, by a provisioning engine and based on indication that no security threat was identified, the first VM image on the virtual computing environment platform;
remove, from the scanning stack and from the approved image data store, a second VM image after expiration of a scan wait time duration; and
remove, by a VM image management service based on an identified threat associated with the first VM image and when the first VM image comprises a saved VM image retrieved from the approved image data store, the first VM image from the approved image data store.

2. The system of claim 1, wherein the plurality of VM images comprise VM images generated by a VM image generation device.

3. The system of claim 1, wherein the instructions cause the VM image management platform to receive, continuously by the scanning stack, a plurality of second VM images received from the virtual computing environment platform.

4. The system of claim 1, wherein the virtual computing environment platform is a cloud computing platform.

5. The system of claim 1, wherein the instructions cause the VM image management platform to load, by the provisioning engine, a saved VM image to the scanning stack.

6. The system of claim 5, wherein the instructions cause the VM image management platform to analyze, by a rules engine, a provisioned VM image using a rule set, wherein the rules engine assigns a severity level to the provisioned VM image based on the analysis.

7. A method comprising:
receiving, continuously at a scanning stack, a plurality of virtual machine images, wherein the scanning stack comprises a last in first out (LIFO) stack;
pulling, by a scanning engine, a first VM image from the scanning stack;

adding, continuously and by a provisioning engine, virtual images to the scanning stack;

scanning, by the scanning engine, the first VM image, wherein the first VM image is stored in an approved image data store based on an indication that the scanning engine failed to identify a threat indicator;

provisioning, by the provisioning engine and based on indication that no security threat was identified, the first VM image on a virtual computing environment platform;

removing, from the scanning stack and from the approved image data store, a second VM image after expiration of a scan wait time duration; and removing, by a VM image management service based on an identified threat associated with the first VM image and when the first VM image comprises a saved VM image retrieved from the approved image data store, the first VM image from the approved image data store.

8. The method of claim 7, wherein the plurality of VM images comprise VM images generated by a VM image generation device.

9. The method of claim 7, further comprising receiving, continuously by the scanning stack, a plurality of second VM images received from the virtual computing environment platform.

10. The method of claim 7, wherein the virtual computing environment platform is a cloud computing platform.

11. The method of claim 7, further comprising loading, by the provisioning engine, a saved VM image to the scanning stack.

12. The method of claim 7, wherein the method further comprises analyzing, by a rules engine, a provisioned VM image using a rule set, wherein the rules engine assigns a severity level to the provisioned VM image based on the analysis; and removing, automatically, a third VM image determined to meet requirement of a high severity level threat; and assigning, automatically, a time limit for correction of a fourth VM image based on an indication of a lower severity level threat, wherein the high severity level threat represents an indication of a failed scan and the lower severity level threat corresponds to an indication that issues found are correctible.

13. Non-transitory computer readable media storing instructions that, when executed by a processor, cause a virtual machine (VM) image management platform to:

receive, continuously at a scanning stack, a plurality of virtual machine images from a virtual computing environment platform;

add, continuously and by a provisioning engine, virtual images to the scanning stack;

pull, by a scanning engine, a first VM image from the scanning stack, wherein the scanning stack comprises a last in first out (LIFO) stack;

scan, by the scanning engine, the first VM image, wherein the first VM image is stored in an approved image data store based on an indication that the scanning engine failed to identify a threat indicator;

provision, by the provisioning engine and based on indication that no security threat was identified, the first VM image on the virtual computing environment platform;

remove, from the scanning stack and from the approved image data store, a second VM image after expiration of a scan wait time duration; and remove, by a VM image management service based on an identified threat associated with the first VM image and when the first VM image comprises a saved VM image retrieved from the approved image data store, the first VM image from the approved image data store.

14. The non-transitory computer readable media of claim 13, wherein the plurality of VM images comprise VM images generated by a VM image generation device.

15. The non-transitory computer readable media of claim 13, wherein the instructions cause the VM image management platform to:

analyze, by a rules engine, a provisioned VM image using a rule set, wherein the rules engine assigns a severity level to the provisioned VM image based on the analysis; and remove, automatically, a third VM image determined to meet requirement of a high severity level threat; and assign, automatically, a first time limit for correction of a fourth VM image based on an indication of a lower severity level threat, wherein the high severity level threat represents an indication of a failed scan and the lower severity level threat corresponds to an indication that issues found are correctible.

16. The non-transitory computer readable media of claim 15, wherein the instructions cause the VM image management platform to:

remove, based on an indication that the lower severity level threat has not been cleared within the first time limit, the fourth VM image.

17. The non-transitory computer readable media of claim 13, wherein the instructions cause the VM image management platform to remove, at least one VM image of the plurality of VM images in the scanning stack based on an indication that the at least one VM image has not been scanned within a second time limit.

* * * * *